(12) United States Patent
Agrawal et al.

(10) Patent No.: US 9,144,528 B2
(45) Date of Patent: Sep. 29, 2015

(54) WEARABLE CABLE-DRIVEN EXOSKELETON FOR FUNCTIONAL ARM TRAINING

(75) Inventors: Sunil Agrawal, Newark, DE (US); Ying Mao, Newark, DE (US); John Scholz, Newark, DE (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1086 days.

(21) Appl. No.: 13/079,534

(22) Filed: Apr. 4, 2011

(65) Prior Publication Data

US 2011/0245738 A1  Oct. 6, 2011

Related U.S. Application Data

(63) Continuation-in-part of application No. 12/568,541, filed on Sep. 28, 2009, now Pat. No. 8,409,118.

(60) Provisional application No. 61/320,470, filed on Apr. 2, 2010, provisional application No. 61/100,407, filed on Sep. 26, 2008.

(51) Int. Cl.
*A61H 1/02* (2006.01)
*A61H 1/00* (2006.01)
(Continued)

(52) U.S. Cl.
CPC ............. *A61H 1/0277* (2013.01); *A61H 1/00* (2013.01); *A61H 1/02* (2013.01); *A61H 1/0274* (2013.01);
(Continued)

(58) Field of Classification Search
CPC ......... A61H 1/00; A61H 1/02; A61H 1/0274; A61H 1/0277; A61H 1/0281; A61H 1/0285; A61H 1/0288; A61H 1/0237; A61H 3/00; A61H 3/008; A61H 2201/5007; A61H 2201/50
USPC ............. 601/33, 23, 5, 11, 34–36, 27–29, 40; 482/51, 79, 1; 602/5, 16, 20–23, 26, 27
See application file for complete search history.

(56) References Cited

U.S. PATENT DOCUMENTS 4,180,870 A   1/1980 Radulovic et al.
4,445,502 A * 5/1984 Swan et al. .................... 601/23
(Continued)

OTHER PUBLICATIONS

Agrawal, Sunil K., "Design and Optimization of a Cable Driven Upper Arm Exoskeleton", Journal of Medical Devices, vol. 3, Transactions of the ASME (Sep. 2009), pp. 031004-1-031004-8.
(Continued)

*Primary Examiner* — Justine Yu
*Assistant Examiner* — Colin W Stuart
(74) *Attorney, Agent, or Firm* — Miles & Stockbridge P.C.; Mark A. Catan

(57) ABSTRACT

A device and method for assisting a user to articulate a limb. The device has an upper section, a lower section, and at least one joint between the upper and lower section. The device comprises an exoskeleton with a first cuff coupled to the lower section of the user's limb, a second cuff coupled to the upper section of the user's limb and a third cuff coupled to a portion of the user's body above the upper section of the limb. At least one cable is attached to the first cuff and at least one cable is attached to the second cuff. A series of drivers located remotely from the exoskeleton are attached to cables and are connected to a processor. The processor transmits signals to the drivers to vary the lengths of the cables to guide articulation of the user's limb.

17 Claims, 8 Drawing Sheets

(51) Int. Cl.
    B25J 9/00       (2006.01)
    B25J 9/10       (2006.01)
(52) U.S. Cl.
    CPC ............... *B25J 9/0006* (2013.01); *B25J 9/104* (2013.01); *A61H 1/0237* (2013.01); *A61H 2201/165* (2013.01); *A61H 2201/5007* (2013.01)

(56) References Cited

U.S. PATENT DOCUMENTS

| | | | |
|---|---|---|---|
| 5,501,656 | A | 3/1996 | Homma et al. |
| 5,601,527 | A | 2/1997 | Selkowitz |
| 5,865,770 | A | 2/1999 | Schectman |
| 7,481,782 | B2* | 1/2009 | Scott et al. .................. 601/5 |
| 8,142,379 | B2 | 3/2012 | Verdonk et al. |
| 2003/0120183 | A1 | 6/2003 | Simmons |
| 2004/0106881 | A1* | 6/2004 | McBean et al. ............... 601/5 |
| 2008/0161971 | A1 | 7/2008 | Buckingham et al. |
| 2008/0304935 | A1 | 12/2008 | Scott et al. |
| 2009/0192420 | A1* | 7/2009 | Armstrong et al. ........... 601/40 |
| 2011/0245738 | A1 | 10/2011 | Agrawal et al. |

OTHER PUBLICATIONS

Balasubramanian, Sivakumar, "RUPERT: An Exoskeleton Robot for Assisting Rehabilitation of Arm Functions", Virtual Rehabilitation (2008), 163-167.

Ball, Stephen J., "A Planar 3DOF Robotic Exoskeleton for Rehabilitation and Assessment", Proceedings of the 29th Annual International Conference of the IEEE EMBS, (Aug. 23-26, 2007), 4024-4027.

Brackbill, Elizabeth A., "Dynamics and Control of a 4-dof Wearable Cable-Driven Upper Arm Exoskeleton", IEEE International Conference on Robotics and Automation (May 12-17, 2009), 2300-2305.

Carignan, Craig, "Distributed Control and Safety System for a Rehabilitation Arm Exoskeleton", Abstract, ASME Conf. Proc., vol. 9: Mechanical Systems and Control, Parts A, B, and C, Mechanical Systems and Control, Symposium on Advances in Robot Dynamics and Control, Paper No. IMECE 2007-41922 (2007), 1 pg.

Carignan, Craig, "Design of an Arm Exoskeleton with Scapula Motion for Shoulder Rehabilitation", Proceedings of the 12th International Conference on Advanced Robotics, ICAR'05, (2005), 524-531.

Gupta, Abhishek, "Design of a Haptic Arm Exoskeleton for Training and Rehabilitation", IEEE/ASME Transactions on Mechatronics, vol. 11, No. 3 (Jun. 2006), 280-289.

Ikuta, Koji, "Safety Evaluation Method of Design and Control for Human-Care Robots", International Journal of Robotics Research, vol. 22, No. 5 (May 2003), 281-297.

Kiguchi, Kazuo, "Development of a 3DOF Mobile Exoskeleton Robot for Human Upper-Limb Motion Assist", Robotics and Autonomous Systems, vol. 56 (2008), 678-691.

Mao, Ying, "Wearable Cable-Driven Upper Arm Exoskeleton-Motion with Transmitted Joint Force and Moment Minimization", IEEE International Conference on Robotics and Automation (May 3-8, 2010), 4334-4339.

Perry, Joel C., "Upper-Limb Powered Exoskeleton Design", IEEE/ASME Transactions on Mechatronics, vol. 12, No. 4 (Aug. 2007), 408-416.

Martinez F., "Design of a Five Actuated DoF Upper Limb Exoskeleton Oriented to Workplace Help", Proceedings of the 2nd Biennial IEEE/RAS-EMBS International Conference on Biomedical Robotics and Biomechatronics (Oct. 19-22, 2008), 169-174.

Roderick, Stephen N., "An Approach to Designing Software Safety Systems for Rehabilitation Robots", Proceedings of the IEEE 9th International Conference on Rehabilitation Robotics (Jun. 28-Jul. 1, 2005), 252-257.

Tsagarakis, N. G., "Development and Control of a 'Soft-Actuated' Exoskeleton for Use in Physiotherapy and Training", Autonomous Robots, vol. 15 (2003), 21-33.

Yang, Guilin, "Kinematic Design of a 7-DOF Cable-Driven Humanoid Arm: A Solution-in-Nature Approach", Proceedings of the IEEE/ASME International Conference on Advanced Intelligent Mechatronics (Jul. 24-28, 2005), 444-449.

* cited by examiner

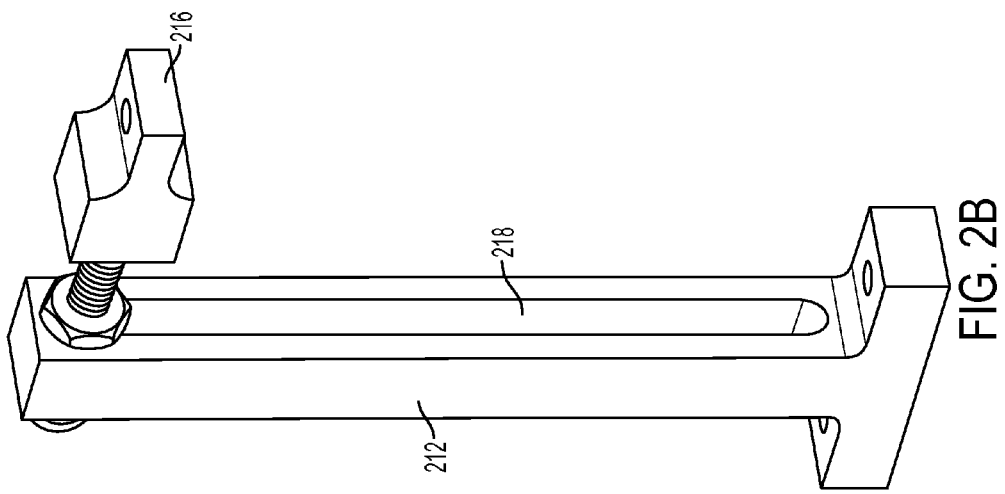

WEARABLE CABLE-DRIVEN EXOSKELETON FOR FUNCTIONAL ARM TRAINING

CROSS REFERENCE TO RELATED APPLICATIONS

This application claims priority to U.S. Provisional Application Ser. No. 61/320,470 titled "A WEARABLE CABLE-DRIVEN EXOSKELETON FOR FUNCTIONAL ARM TRAINING OF STROKE SURVIVORS," filed Apr. 2, 2010, incorporated herein by reference, and is further a continuation-in-part of U.S. patent application Ser. No. 12/568,541, titled "UPPER ARM WEARABLE EXOSKELETON," filed Sep. 26, 2009, incorporated herein by reference, which claims priority to U.S. Provisional Application Ser. No. 61/100,407 titled "UPPER ARM WEARABLE EXOSKELETON," filed Sep. 26, 2008.

FIELD OF THE INVENTION

The present invention relates to an arm exoskeleton apparatus designed to assist and train arm movements. The exoskeleton may be attached or worn by a user. The weight of the exoskeleton is reduced because the bulk of the motors, servos and wire spools are suspended above the user on a frame.

BACKGROUND OF THE INVENTION

Stroke is the third leading cause of death among adults in the US and the leading cause of disability. The ability to use the wrist and hand to orient and grasp objects is at most risk in moderately impaired individuals such as those suffering the after effects of a stroke. To effectively use the impaired wrist and hand functionally, persons need the ability to position and stabilize the hand at appropriate spatial locations. This ability may be greatly impaired in a person who has suffered a stroke.

One important question that has not been addressed systematically in this population is how much of their inability to use the wrist and hand functionally is contributed by the inability to properly control and stabilize the arm posture versus specific difficulty in coordinating the wrist and hand muscles. If poor control of the arm posture has consequences for wrist and hand control, then the training of wrist/hand function should be facilitated by an intervention that assists with arm postural control.

Over the past several years, arm training devices have been developed to assist in rehabilitating patients who have suffered loss of arm movement, such as due to an injury or stroke. One such device is described in U.S. patent application Ser. No. 12/568,541, titled "UPPER ARM WEARABLE EXOSKELETON," filed Sep. 26, 2009, incorporated herein by reference. Many prior devices, including the device described in the above-referenced patent application, have been limited in their capabilities due to their weight. For example, in one embodiment of the device described in the above-referenced patent application, a plurality of cables are driven by motors mounted to a shoulder cuff worn by the patient. The weight of the motors mounted to the shoulder cuff may add significant weight to a device for use with a patient who may already be in a somewhat weakened state. Accordingly, there exists a need to develop a device to assist and train arm movements of stroke survivors or subjects with weak musculature that can be worn by the user as an exoskeleton without providing a cumbersome amount of weight that will hinder the user's movement and rehabilitation process.

SUMMARY OF THE INVENTION

The various aspects of the invention generally comprises a limb assistance device and system as well as a method for operating the limb assistance device.

One exemplary embodiment relates to a device for assisting a user to articulate a limb, the device having an upper section, a lower section, and at least one joint between the upper and lower section. In this embodiment, the device comprises an exoskeleton with a first cuff adapted to be coupled to the lower section of the user's limb. The exoskeleton also includes a second cuff adapted to be coupled to the upper section of the user's limb. The exoskeleton also includes a third cuff adapted to be coupled to a portion of the user's body above the upper section of the limb.

The first embodiment of the limb assistance device includes one or more first cables attached to the first cuff and one or more second cables attached to the second cuff. Each of the first and second cables are attached to a cable-specific attachment point on the respective cuff. In one exemplary embodiment, the first and second cables are made of either metal wire or nylon.

Furthermore, the limb assistance device includes one or more first drivers. Each first driver is coupled to one of the first cables. Each of the first cables have a variable length between the first driver and the cable-specific attachment point controlled by the first driver. The one or more first drivers is located remotely from the exoskeleton.

The limb assistance device also includes one or more second drivers. Each second driver is coupled to one of the second cables. Each of the second cables have a variable length between the second driver and the cable-specific attachment point controlled by the second driver. Like the one or more first drivers, the one or more second drivers is located remotely from the exoskeleton.

Finally, the first exemplary embodiment of the limb assistance device includes a processor operatively coupled to each of the one or more first drivers and the one or more second drivers. The processor is configured to transmit signals for manipulating the drivers to vary the lengths of the first cables and the second cables to guide articulation of the user's limb.

In one exemplary embodiment, each driver is a motor having a rotating cylinder attached. The cable is configured to be wound and unwound on the rotating cylinder in response to the rotation of the motor. In some embodiments, each rotating cylinder may be threaded with a groove configured to receive the attached cable therein. In one embodiment, the rotating cylinder comprises a spool attached to the motor shaft on which the cable is wound. In another embodiment, the rotating cylinder comprises a threaded motor shaft.

In another embodiment of the limb assistance device, the device further includes a frame. The frame defines a space around the exoskeleton and the drivers are attached to the frame. A positioning member may be used for positioning the user in a fixed location relative to the drivers.

In another embodiment of the limb assistance device, there may be guides mounted to the third cuff. These guides are used for guiding the first and second cables.

The limb assistance device may be specifically configured to assist a user articulate the user's arm. In one embodiment of this configuration, the second cuff is configured to attach to a user's upper arm between a user's elbow and shoulder and the third cuff is configured to attach to the user's shoulder. Furthermore, the first cuff may be configured to attach to a user's forearm between a user's hand and elbow, such as to a user's wrist.

In another embodiment of the limb assistance device, the device has one or more force sensors. The force sensors are configured to measure force transmitted via at least one of the first or second cables and to communicate a measured force signal to the processor. The processor may be configured to use the measured force signal as feedback to regulate an amount of assistance provided by the device to the user. Furthermore, the processor may be configured to cause the device to operate with a range of assistance forces from a relatively greater amount of force to relatively lesser amount of force.

Another embodiment of the present invention relates to a method of assisting a user to articulate a limb. The method includes providing a limb assistance device similar to the one described above. The exoskeleton of the device is then coupled to the user's limb. Finally, a signal is transmitted from the processor to one or more of the first and second drivers, causing the one or more drivers to vary the length of one or more of the attached cables to articulate the user's limb from a first position to a second position.

Another embodiment described herein relates to a method for providing physical therapy to a patient to assist the patient regain motor functions for articulation of a limb. This method includes providing a limb assistance device as described above. The exoskeleton of the limb assistance device is then coupled to the patient's limb. Signals are then transmitted from the processor to one or more of the first and second drivers, causing the one or more drivers to vary the length of one or more of the attached cables to articulate the user's limb from a first position to a second position. This step is then repeated for a plurality of different first positions and second positions as part of a physical therapy regime.

In one embodiment of the method for providing physical therapy all of the steps of the method are performed in a first physical therapy session with the processor set to provide a first relatively greater amount of assistance force to the patient. The steps are then repeated in a second physical therapy session, subsequent to the first physical therapy session, with the processor set to provide a second relatively lesser amount of assistance force to the patient. In another embodiment of the method for providing physical therapy, all of the steps are repeated in a plurality of physical therapy sessions while gradually reducing the amount of assistance force from session to session until the user has regained a desired amount of motor control of the articulated limb.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings:

FIG. 2B is an enlarged side view of an exemplary extension used with this exoskeleton;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the disclosure without departing from the invention.

Figure 1:
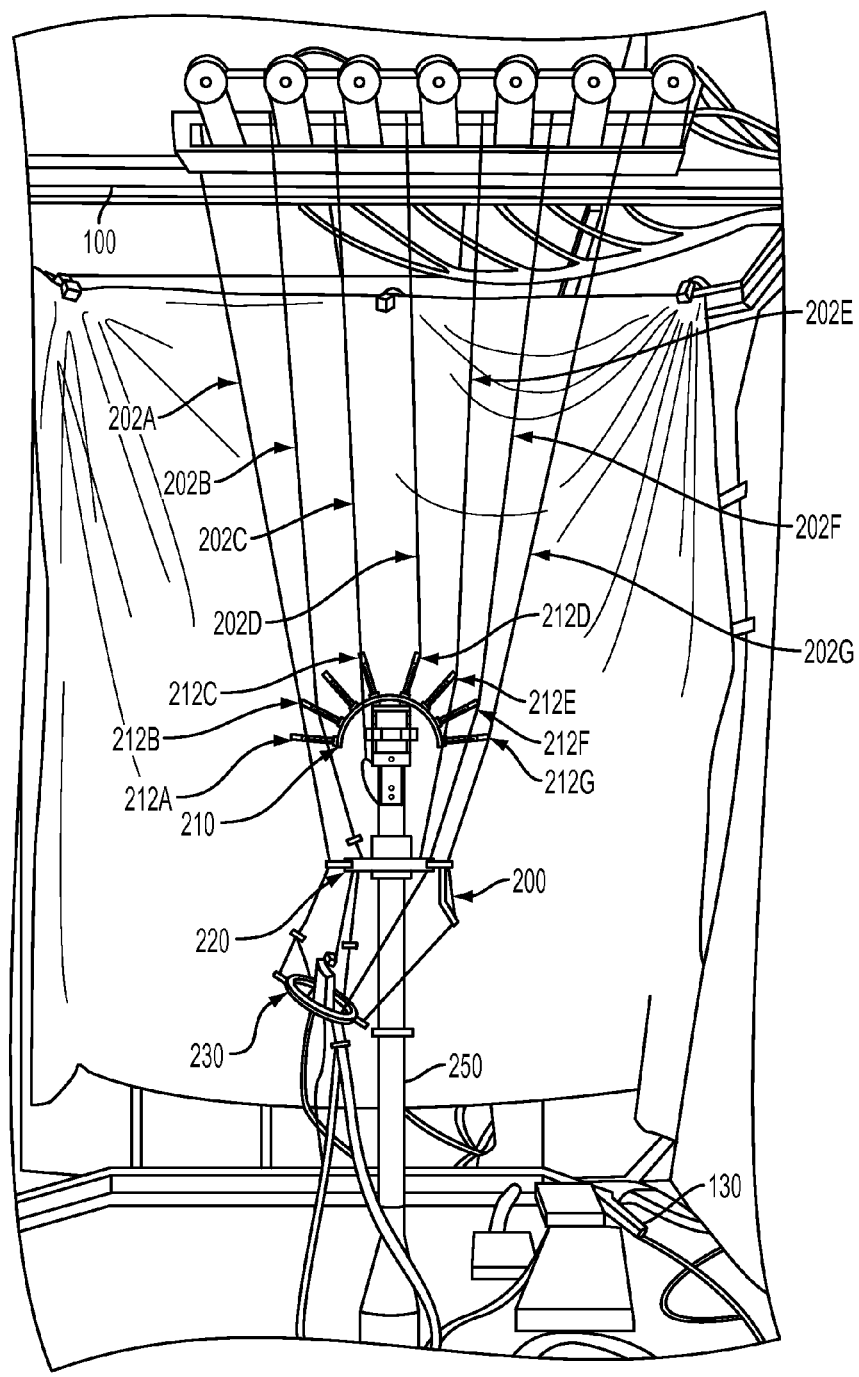
FIG. 1 is a perspective view of the frame, exoskeleton, and motors of one embodiment of the present invention.

The present invention relates to a cable-driven upper arm exoskeleton. As shown in FIG. 1, one embodiment of the invention generally includes a frame 100 that defines a space within which the user may either stand or sit. Connected to frame 100 and inside the space defined by frame 100 is exoskeleton 200. Exoskeleton 200 includes three cuffs 210, 220, 230, shown in FIG. 2. Cables 202, attached at a first end to threaded spools 310 as shown in FIGS. 3A and 3B, drive exoskeleton 200. Cables 202 may be made of metal, nylon or any other such material as is known in the art. The term "cable" as used herein is intended to encompass any materials of construction. Threaded spools 310 are attached to drive shafts 322 of motors 320. Motors 320 are supported by aluminum frame 100 and are located in an area adjacent to exoskeleton 200. As shown in FIG. 1, motors 320 and threaded spools 310 are located on a rack mounted to frame 100 above the exoskeleton. The exoskeleton attaches to a user's arm via three cuffs 210, 220, 230. The user's arm may be manipulated through a series of movements or exercises controlled by motors 320, cables 202 and exoskeleton 200. Although the embodiment described herein uses motors with rotating shafts to vary the length of the cables extended between the attachment points on the motors and the attachment points on the cuffs, the invention is not limited to any particular type of driver for varying the length of the cables.

Figure 2:
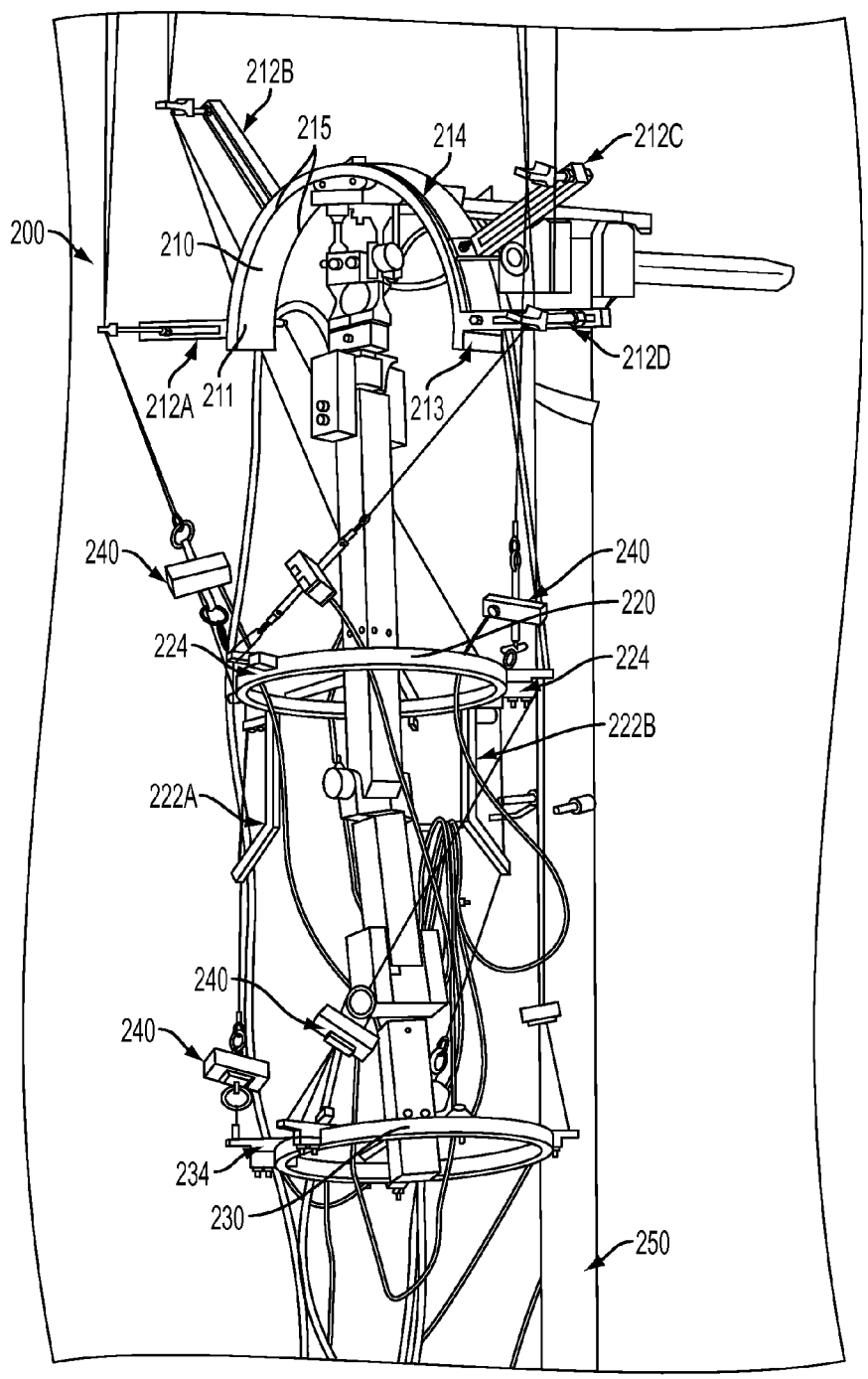
FIG. 2 is an enlarged perspective view of the exoskeleton illustrated in FIG. 1.
Figure 3A:
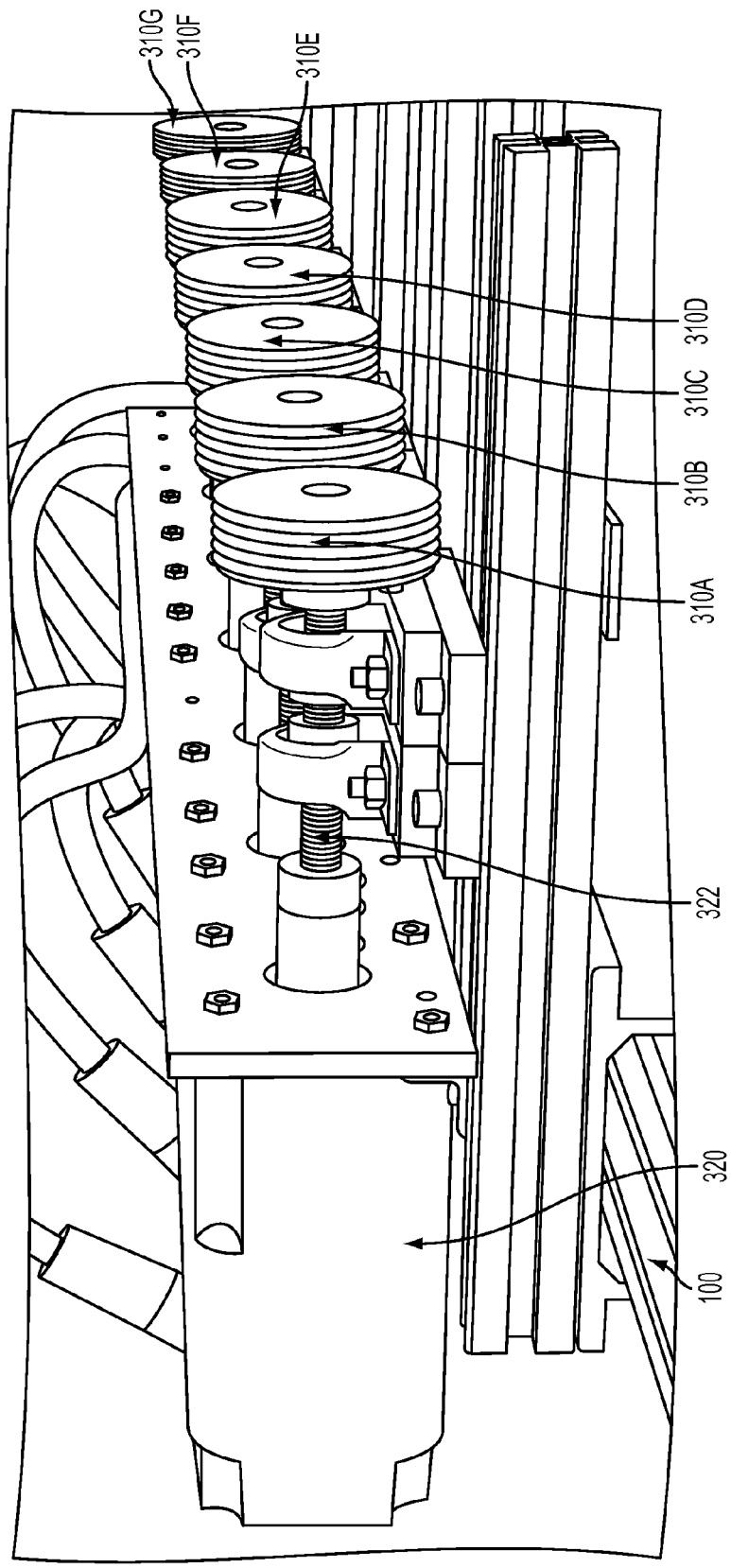
FIG. 3A is an enlarged side-perspective view of the motors and threaded cylinders according to a first embodiment of the present invention.
Figure 3B:
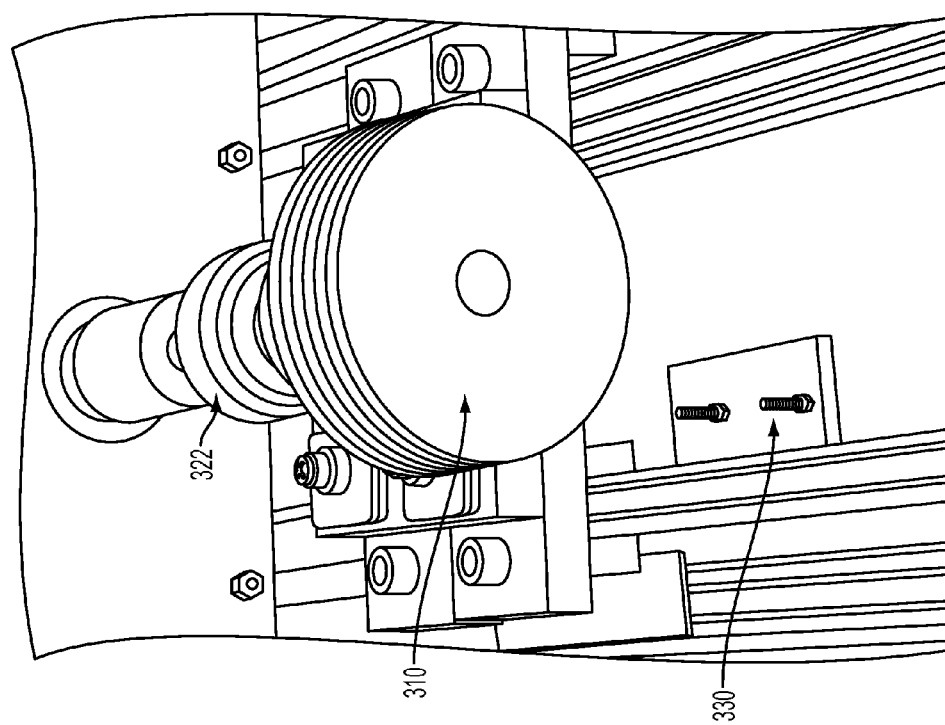
FIG. 3B is an enlarged top-perspective view of a single threaded cylinder according to a first embodiment of the present invention.

It should be understood that the components shown mounted inside the cuffs in FIGS. 1 and 2 are not part of the invention, but rather represent a user's shoulder joint, upper arm, elbow joint, lower arm, wrist joint, and hand for the purposes of testing the device. As shown in FIG. 1, cuff 230 is attached to the "user" between the user's hand and elbow. As shown in FIG. 2, cuff 230 is attached to the "user's" wrist.

Figure 2A:
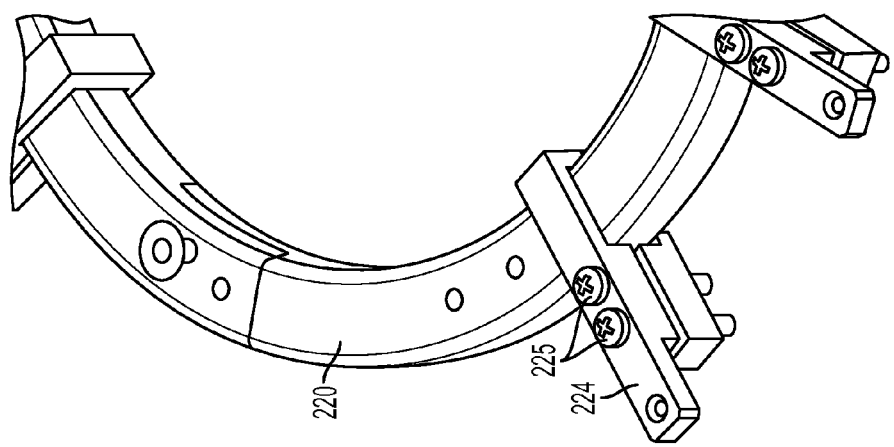
FIG. 2A is an enlarged perspective view of exemplary attachment ears attached to an exemplary cuff of the exoskeleton.

Cables 202 are wound into the threads on spools 310 to prohibit tangling of cables 202. The second end of each cable 202 is connected to one of the three cuffs 210, 220, 230. Cuffs 210, 220, 230 may include extensions 212, 222 or attachment ears 224, 234 located on the circumference of the cuffs to provide attachment points for the cables 202. The cables may be directed through the extensions 212, 222, preventing the cables from becoming entangled and interfering with the operation of the exoskeleton. The second ends of the cables are attached to attachment ears 224, 234. The positions of attachments ears 224, 234 along the circumference of cuffs 220, 230 are preferably adjustable to permit location of the ears in an optimum location for different users or different uses of the exoskeleton. An enlarged view of the attachment ears 224, 234 is shown in FIG. 2A. As shown, the attachment ears may be tightened by screws 225 to be secured in place. Loosening screws 225 allow the attachment ears 224, 234 to be moved around the circumference of the cuffs 220, 230. Other variations of the attachment ears 224, 234, that allow their position to be adjusted around the circumference of the cuff, may also be used. Adjustability also helps to prevent possible entanglement of the cables as well as allows for greater comfort for the user.

A control algorithm allows the exoskeleton to function as a training device in addition to an assistance device. This control algorithm assists victims of traumatic brain injuries, for example, in relearning how to move their arm for everyday tasks by helping the user learn from tasks performed using the exoskeleton so that they may eventually perform such tasks without the aid of the exoskeleton.

The control system of the present invention, along with a wearable exoskeleton, can provide various levels of assistance to persons with arm movement impairments following stroke, to improve neuromuscular coordination and provide neuro-rehabilitation of persons after traumatic brain injury.

As shown in FIG. 1 and in greater detail in FIG. 2, exoskeleton 200 consists of three aluminum cuffs 210, 220, 230 which attach to the human user. Cuff 210 attaches to the user at the shoulder, cuff 220 attaches to the user at the upper arm, and cuff 230 attaches to the user at the forearm. Shoulder cuff 210 is a semicircle shape that rests across the top of the user's shoulder Shoulder cuff 210 may be equipped with extension pieces 212. An enlarged view of the extension piece 212 is shown in FIG. 2B. Extension pieces 212 include an adjustable eye bolt 216 through which the cable 202 may pass through or be attached to. The length of the extension piece 212 may include a slot 218 that allows the eyebolt to be moved closer to, or further away from, shoulder cuff 210. In a first embodiment, shoulder cuff 210 includes as many extension pieces 212 as there are motors 320 and threaded spools 310. In a second embodiment, shoulder cuff 210 includes fewer extension pieces 212 than cables 202, with multiple cables 202 directed through one or more of the extension pieces 212. For example, as shown in FIG. 1, seven shoulder extensions 212A-212G are located along shoulder cuff 210. One wire 202A-202G passes through each extension piece. Conversely, as shown in FIG. 2, only four shoulder extensions 212A-212D are shown. In this example, multiple cables 202 pass through extension pieces 212A, 212B and 212C.

The location of the extension pieces 212 on cuff 210 may also be adjustable. For example, as shown in FIG. 2, shoulder extensions 212 are mounted along grooved track 214, in which each extension is bolted in place with a pair of bolts 215, with bolt head 211 adjacent an inside surface of the track with the bolt extending through groove 214, through a hole in the base of extension 212, and fastened in place with nut 213 adjacent the base of the extension. The number of shoulder extensions 212 used and the locations of the extensions may be changed as required by the exercise needed for the user.

As shown in FIG. 2, seven cables (not labeled) are routed through the extension pieces 212A-212D on the upper arm cuff 210. Four of the cables 202 are responsible for controlling the three degrees-of-freedom at the shoulder and are attached to attachment ears 224 on upper arm cuff 220. The other three cables 202 are routed through the upper arm cuff 220 to attachment ears 234 on cuff 230 for attachment to the user's forearm. These three cables 202 control the elbow flexion and extension as well as forearm pronation and supination. These three cables also may be passed through extensions 222A and 222B to keep them from becoming entangled and to have them located at the appropriate angle for the exercise or movements required. The invention is not limited to any particular number of cables.

Load cells 240, located near the termination of cables 202, are electronically connected to processor 130 for providing feedback information relating to the tensions of the cables 202, as needed. In one prototype embodiment of the present invention, MLP-50 Load Cells, available from Transducer Techniques of Temecula, Calif., were used as load cells 240.

As discussed above, the first ends of cables 202 are attached to threaded spools 310, which wind and unwind cables 202. As shown in FIG. 3A, spools 310A-310G are coupled to the drive shafts 322A-322G of motors 320A-320G. The threads in spools 310, keep cables 202 from winding on top of themselves. A rubber guide 330 beneath the threaded spool 310 guides the cable 202 into the threads of the spool 310. The guide facilitates precise winding or unwinding of the cables 202 and maintains tension on the cable between the threaded spool 310 at the cable's first end and the attachment point at the cable's second end. Maintaining tension permits accurate cable length estimation from motor encoder data, which is relayed to the processor 130 attached to the motors 320. The processor is configured to estimate arm configuration based upon the length of the cable that has either been wound or unwound.

Figure 4A:
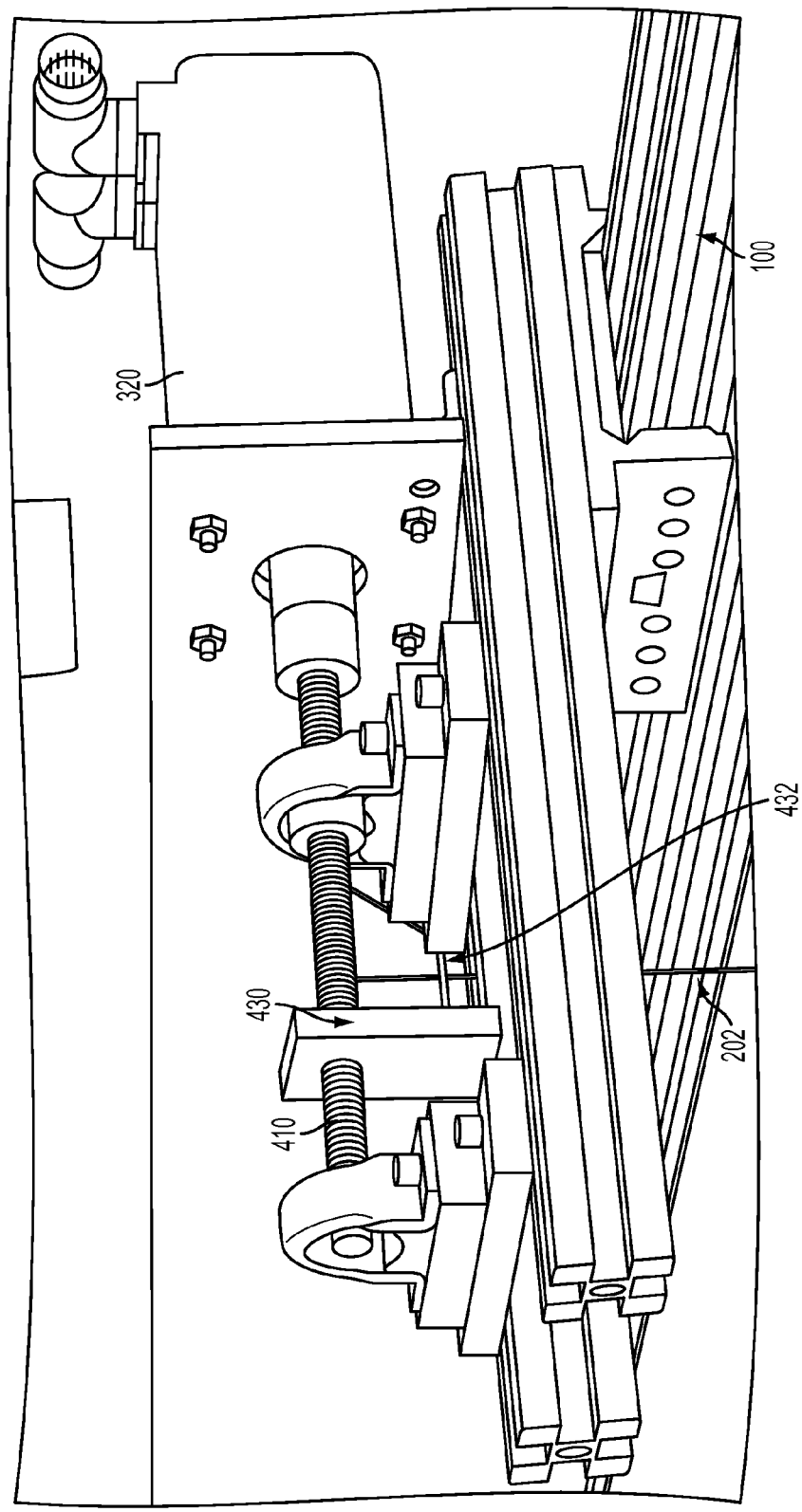
FIG. 4A is an enlarged side-perspective view of a single motor and threaded rod according to a second embodiment of the present invention.
Figure 4B:
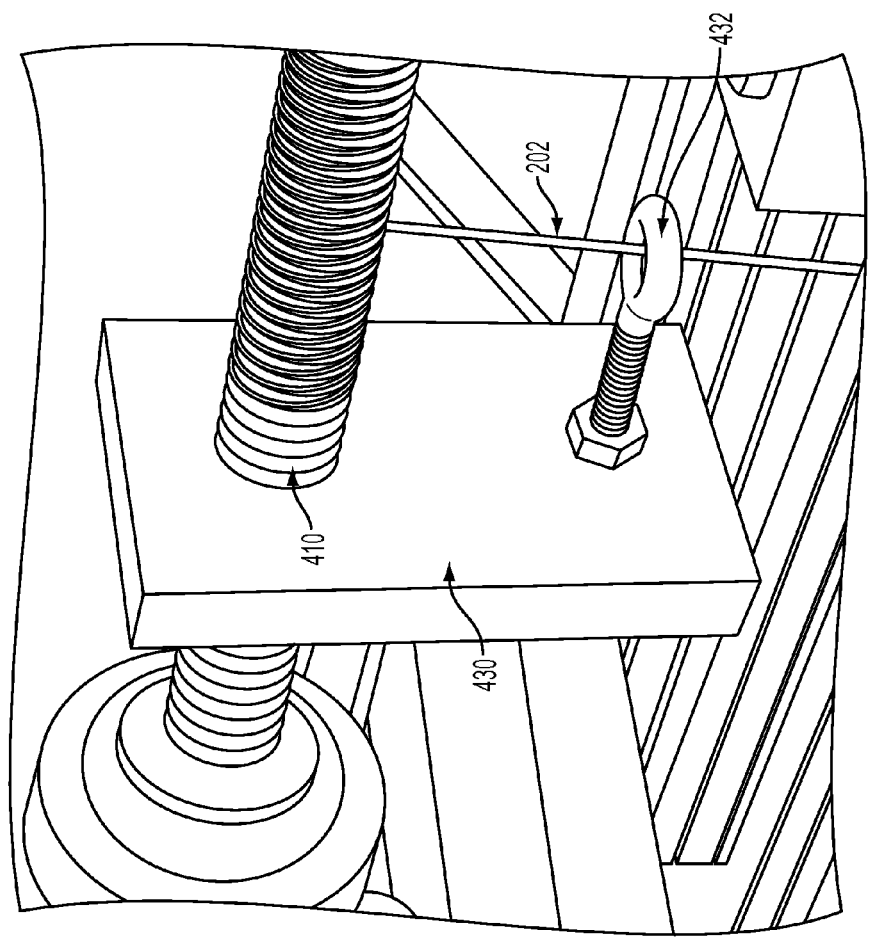
FIG. 4B is an enlarged side-perspective view of a single threaded rod according to a second embodiment of the present invention.

In an alternative embodiment shown in FIGS. 4A and 4B, threaded rods 410 replace the grooved spools depicted in FIGS. 3A and 3B. For example, threaded rods 410 may comprise the drive shaft of motor 320, thereby negating the need to attach a threaded spool. As shown in FIG. 4B, a slider 430 may be mounted onto threaded rod 410. This slider 430 moves along the threads and keeps a proper distance from the cable being wound or unwound. The slider 430 comprises a guide, such as eyebolt 432, that guides cable 202 into the threads.

In an exemplary embodiment, motors 320 comprise high-torque direct-drive motors 320 electronically connected to processor 130. Motors 320 are configured to transmit information to the processor, such as the degree and direction of rotation of the drive shaft 322. Likewise, motors 320 may receive commands from the processor 130, such as how far to rotate the drive shaft 322 and in which direction to rotate the drive shaft 322. It is understood to one of skill in the art that motors 320 may be any motor known in the art that can accomplish these tasks described above. In one prototype embodiment depicted in FIGS. 1, 3A, 3B, 4A and 4B, motors 320 were Kollmorgan GoldLine XT AC motors available from Kollmorgan of Radford, Va., powered by a Kollmorgan Servo STAR servo drive, which provided torque, speed and position control. The electronics for the system may be integrated using a real time control system, such as the NI-PXI control system available from National Instruments Corporation of Austin, Tex.

Although not shown, each motor 320 may also include an encoder that records the movement of its respective motor 320 and transmits a signal to a processor 130 that indicates the distance that respective cable 202 may have moved. As described above, processor 130 is also operatively coupled to motors 320 to transmit signals to motors 320 to selectively release or retain cables 202 as required by the exercise. These signals may be sent by processor 130 from a plurality of preprogrammed tasks contained in processor 130 or they may be manually entered as needed. The encoders on motors 320 transmit signals to processor 130 to provide information to processor 130 so that processor 130 transmits signals to motors 320 to operate for a proper amount of time. Furthermore, load cells 240 are electrically connected to processor 130. Load cells 240 may relay information such as the tension force on the cables 202 as well as the location of the load cells 240 to processor 130.

Each position in space reachable by the exoskeleton may be characterized by a combination of lengths of the cables. By way of example, a preprogrammed task may be to use a fork to move food from a plate to the user's mouth. The encoders on motors 320 transmit information to processor 130 such that processor 130 transmits signals to the correct motors 320 to operate some or all of motors 320 to move smoothly along a predetermined path from a first characterized location with the fork in contact with food on the plate to a second characterized location with the fork adjacent the user's mouth. Further, processor 130 may be programmed to adjust its assistance over time, from, for example, an assistive device that generates the bulk of the energy and arm manipulation required to complete the required task, to a rehabilitative device that allows the user to self-manipulate his/her arm, with exoskeleton 100 providing less and less support as the user gains strength in the arm.

In one embodiment, processor 130 may be attached to frame 100 or located within the space defined by frame 100 such that it may be accessed by either the user or another person directly helping the user. In another embodiment, processor 130 may be located outside of the space defined by the frame and may not be accessed by the user. Finally, it is understood that processor 130 may be connected via wires or connected wirelessly to motors 320, load cells 240 and any encoders.

In the embodiments described above, the motors 320 and threaded spools 310 are mounted to a frame 100 that defines a space in which the user may stand or sit. The exoskeleton 200 is placed within this space. In one embodiment of the invention, motors 320 and threaded spools 310 may be permanently attached to the frame such that they are secured in place at all times. In another embodiment of the invention, motors 320 and threaded spools 310 may be attached to the frame such that they may be moved around to accommodate different users and or different activities. The exoskeleton may be anchored to a positioning member such as post 250 shown in FIGS. 1 and 2. Post 250 is configured to position a user in a standing position relative to the frame and may be affixed to the ground in a specific location relative to frame 100. It should be understood that the positioning member may instead be a configured to position the user in a sitting position, such as a positioning member integrated with or adjacent to a chair. The position of the user may be fixed or unfixed relative to the post 250. Because the post 250 is fixed, the relative lengths of the cables corresponding to a certain position for the user may be generally repeatable. In particular, if a user participates in a sequence of physical therapy sessions spaced over a period of days, weeks, months, or even years, information related to positioning of the user when used in conjunction with a fixed positioning member will be constant relative to the fixed positions of the drivers. Furthermore, the post 250, as shown in FIG. 2 is fixed to the ground. In an alternative embodiment, a supporting bar may be substituted for the post and the supporting bar may be suspended on the aluminum frame.

In another embodiment of the present invention, the threaded cylinders 310 and motors 320 may be mounted directly to any area surrounding a space in which the user may stand or sit. In this embodiment, for instance, the cylinders 310 and motors 320 may be directly mounted to a wall, ceiling, floor, or other such surrounding structure. This embodiment of the invention (not shown) eliminates the need for frame 100. What is important, however, is that the motors are located remotely from the exoskeleton (not mounted on it or otherwise attached to it), thereby removing the weight associated with the motors from being carried by the patient. In an alternative embodiment, the motors may be attached to the positioning member.

Finally, although the exoskeleton shown and described herein is configured for use with an upper body limb (shoulder-upper arm-elbow-forearm-wrist-hand) of a user, the same principles described herein may be configured for use in connection with a user's lower body limb (hip-thigh-knee-shin-angle-foot), While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A device for assisting a user to articulate a limb, the limb having an upper section, a lower section, and at least one joint between the upper and lower section, the device comprising:
   an exoskeleton comprising:
      a first cuff adapted to be coupled to the lower section of the user's limb,
      a second cuff adapted to be coupled to the upper section of the user's limb, and
      a third cuff adapted to be coupled to a portion of the user's body above the upper section of the limb;
   one or more first cables attached to the first cuff and one or more second cables attached to the second cuff, each of the one or more first and second cables attached to a respective cable-specific attachment point on a respective one of the first and second cuffs;
   a respective driver for, and coupled to, each of the one or more first and second cables, each of the one or more first and second cables having a variable length between the respective driver and the respective cable-specific attachment point controlled by the respective driver, the respective drivers being attached to a frame that is separate from and located remotely from the exoskeleton; and
   a processor connected to control each of the respective drivers, the processor being programmed to generate control signals causing the each of the respective drivers to vary the lengths of the one or more first and second cables to guide articulation of the user's limb;
   the one or more first cables being routed through adjustable extensions on the second cuff and attaching to adjustable extensions on the first cuff, the first and second cuffs being adapted to be coupled on opposites sides of the at least one joint and to apply tension forces directly between the first and second cuffs to permit control of flexion and extension of the at least one joint therebetween,
   the first, second, and third cuffs are unconnected by rigid linked elements between the first, second, and third cuffs such that movement of the limb, caused by tension in the one or more first and second cables, is mediated only by the at least one joint.

2. The device of claim 1, wherein each of the respective drivers comprises a motor having a rotating cylinder attached thereto, wherein a respective one of the one or more first and second cables is wound and unwound on the rotating cylinder in response to rotation of the motor.

3. The device of claim 2, wherein the rotating cylinder of the motor of said each of the respective drivers is threaded with a groove configured to receive the respective one of the one or more first and second cables therein.

4. The device of claim 2, wherein the rotating cylinder of the motor of said each of the respective drivers comprises a threaded shaft around which the respective one of the one or more first and second cables is wound, thereby keeping the respective one or more first and second cables from winding on top of itself.

5. The device of claim 1, wherein the frame defines a space around the exoskeleton.

6. The device of claim 1, wherein the third cuff includes a positioning member shaped to receive and position the user in a fixed location relative to the respective drivers.

7. The device of claim 1, further comprising guides on the third cuff that guide the one or more first and second cables.

8. The device of claim 1, wherein the device is configured to assist a user in the articulation of the user's arm.

9. The device of claim 1, wherein the device further comprises one or more force sensors, each force sensor configured to measure force transmitted via at least one of the one or more first or second cables and to communicate a measured force signal to the processor.

10. The device of claim 9, wherein the processor is programmed to regulate an amount of assistance provided by the device to the user responsively to one or more of the measured force signals communicated to the processor.

11. A method of assisting a user to articulate a limb, the method comprising:
providing the device of claim 1;
coupling the exoskeleton to the user's limb; and
transmitting a signal from the processor to the respective drivers, causing the respective drivers to vary the length of one or more of the attached one or more first and second cables to articulate the user's limb from a first position to a second position.

12. A method for providing physical therapy to a user to help the user regain motor functions for articulation of a limb, the method comprising:
(a) providing the device of claim 1;
(b) coupling the exoskeleton to the user's limb;
(c) transmitting signals from the processor to the respective drivers, causing the respective drivers to vary the length of one or more of the one or more first and second cables to articulate the user's limb from a first position to a second position; and
(d) repeating step (c) for a plurality of different first positions and second positions as part of a physical therapy regimen.

13. The method of claim 12, comprising performing steps (a)-(d) in a first physical therapy session with the processor set to provide a first amount of assistance force to the user, and repeating steps (a)-(d) in a second physical therapy session, subsequent to the first physical therapy session, with the processor set to provide a second amount of assistance force to the user, the first amount of assistance force being greater than the second amount of assistance force.

14. The method of claim 12, comprising repeating steps (a)-(d) in a plurality of sessions for physical therapy while gradually reducing an amount of assistance force from session to session until the user has regained a desired amount of motor control of the articulated limb.

15. The device of claim 1, wherein the one or more first and second cables include a set of at least three cables, each position in space being reachable by a respective one of the first and second cuffs controlled by said set of at least three cables and characterized by a combination of lengths of the set of at least three cables.

16. The device of claim 15, wherein the set of at least three cables controls flexion, extension, pronation, and supination of a lower portion of the limb.

17. A system for rehabilitating a patient, comprising:
a frame having motor-driven cable actuators thereon and cables connected to the cable actuators;
cuffs adapted for attachment to parts of a patient's body; and
at least two of the cuffs having adjustable extensions through which respective ones of the cables either pass through or are connected to the at least two of the cuffs,
wherein the at least two of the cuffs are adapted to attach to parts of the patient's body on opposite sides of a joint of a limb with at least one of the cables passing through one of the at least two cuffs and attaching to the other of the at least two cuffs such that generating tension in the at least one of the cables is adapted to flex or extend the joint when the patient is attached to the cuffs,
the at least two cuffs are unconnected by rigid linked elements between the cuffs such that movement of the limb, caused by tension in the at least one cable, is mediated only by the joint, and
the weight of the actuator of the at least one cable is fully borne by the frame such that the tension is adapted to apply a force to the patient relative to the frame as well as to generate a moment caused by the tension between the at least two cuffs, the effect of the tension between the at least two cuffs relative to the force applied to the patient relative to the frame being adjustable by adjustment of the adjustable extensions.

* * * * *